United States Patent
Hemmer et al.

(10) Patent No.: US 10,783,669 B2
(45) Date of Patent: Sep. 22, 2020

(54) TEXTURE COORDINATE COMPRESSION USING TEXTURE ATLAS

(71) Applicant: Google LLC, Mountain View, CA (US)

(72) Inventors: Michael Hemmer, San Francisco, CA (US); Pierre Alliez, Sophia Antipolis (FR)

(73) Assignee: Google LLC, Mountain View, CA (US)

(*) Notice: Subject to any disclaimer, the term of this patent is extended or adjusted under 35 U.S.C. 154(b) by 60 days.

(21) Appl. No.: 16/142,990

(22) Filed: Sep. 26, 2018

(65) Prior Publication Data

US 2020/0098137 A1    Mar. 26, 2020

(51) Int. Cl.
*G06T 9/00*    (2006.01)

(52) U.S. Cl.
CPC .................... *G06T 9/001* (2013.01)

(58) Field of Classification Search
None
See application file for complete search history.

(56) References Cited

U.S. PATENT DOCUMENTS

| | | | | |
|---|---|---|---|---|
| 5,929,860 A | * | 7/1999 | Hoppe | G06T 17/20 345/419 |
| 2011/0285708 A1 | * | 11/2011 | Chen | G06T 9/001 345/420 |
| 2017/0076438 A1 | * | 3/2017 | Kottenstette | G06K 9/00637 |

OTHER PUBLICATIONS

Isenburg, et al., "Compressing Texture Coordinates with Selective Linear Predictions", Computer Graphics International, 2003, 6 pages.
Levy, et al., "Least squares conformal maps for automatic texture atlas generation", SIGGRAPH'02 Conf. Proceedings, 2002, pp. 362-371.
Maillot, et al., "Interactive texture mapping", SIGGRAPH'93 Proceedings, 1993, pp. 27-34.
Extended European Search Report for European Application No. 19199702.2, dated Jan. 22, 2020, 7 pages.
Gatys, et al., "Texture Synthesis Using Convolutional Neural Networks", retrieved from: https://pdfs.semanticscholar.org/f54a/e5229960b828db7cd963150c8b8bc2684737.pdf, 9 pages, May 27, 2015, XP055430132.
Portaneri, et al., "Cost-driven framework for progressive compression of textured meshes", Proceedings of the 10th ACM Multimedia Systems Conference, Jun. 18, 2019, pp. 175-188, XP055657913.
Vasa, et al., "Efficient encoding of texture coordinates guided by mesh geometry", Computer Graphics Forum, vol. 33, No. 5, Aug. 1, 2014, pp. 25-34, XP055657881.

* cited by examiner

*Primary Examiner* — Michelle Chin
(74) *Attorney, Agent, or Firm* — Brake Hughes Bellermann LLP

(57) ABSTRACT

An encoder may perform a method of compressing texture coordinates using texture atlas. In one example implementation, the method may include predicting texture coordinates of a corner of a triangle, the triangle being one of a plurality of triangles of a geometric mesh, the predicting based on a corresponding texture atlas and local information associated with the corner. The method further includes determining a residual vector based on the predicted texture coordinates, performing entropy encoding of the residual vector along with residual vectors of other corners of the geometric mesh, and generating compressed data based on the entropy encoding.

20 Claims, 8 Drawing Sheets

TEXTURE COORDINATE COMPRESSION USING TEXTURE ATLAS

BACKGROUND

This application relates to mesh compression (or encoding). During the encoding of a mesh (e.g., a geometric mesh), the connectivity of the mesh is encoded first. The connectivity defines the number of vertices in the mesh and how the vertices are connected. The positions of the vertices are encoded next followed by the encoding of texture coordinates associated with each corner of the triangles in the mesh.

SUMMARY

An example computer-implemented method of compressing texture coordinates is described. In one aspect, the method includes predicting, by a texture coordinate prediction module, texture coordinates of a corner of a triangle, the triangle being one of a plurality of triangles of a geometric mesh. The predicting is based on a corresponding texture atlas and local information associated with the corner. The method further includes determining, by a residual vector module, a residual vector based on the predicted texture coordinates, performing, by an entropy module, entropy encoding of the residual vector along with residual vectors of other corners of the geometric mesh, and generating, by the entropy module, compressed data based on the entropy encoding.

Another aspect is a non-transitory computer-readable storage medium having stored thereon computer executable program code which, when executed on a computer system, causes the computer system to perform mesh compression. The mesh compression includes predicting texture coordinates of a corner of a triangle, the triangle being one of a plurality of triangles of a geometric mesh, the predicting based on a corresponding texture atlas and local information associated with the corner. The mesh compression further includes determining a residual vector based on the predicted texture coordinates, performing entropy encoding of the residual vector along with residual vectors of other corners of the geometric mesh, and generating compressed data based on the entropy encoding.

Another aspect is an encoder comprising a texture coordinate prediction module configured to predict texture coordinates of a corner of a triangle, the triangle being one of a plurality of triangles of a geometric mesh, the predicting based on a corresponding texture atlas and local information associated with the corner. The encoder further comprises a residual vector module to determine a residual vector based on the predicted texture coordinates and an entropy module to perform entropy encoding of the residual vector along with residual vectors of other corners of the geometric mesh and generate compressed data based on the entropy encoding.

In one more aspects, a decoder performs predictions on the compressed data and uses the residual vectors to determine the actual coordinates from the predicted coordinates.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

Figure 1:
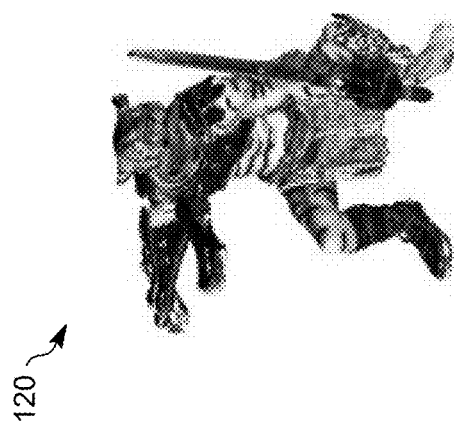
FIG. 1 illustrates an example three-dimensional (3D) image generated by a graphics processor, according to at least an example implementation.

It should be noted that these Figures are intended to illustrate the general characteristics of methods, structure, or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementation. The use of similar or identical reference numbers in the various drawings is intended to indicate the presence of a similar or identical element or feature.

DETAILED DESCRIPTION

During mesh compression, an encoder is configured to predict unknown texture coordinates of a corner of a triangle in a mesh. The prediction is based on information available in a texture atlas and known texture coordinates of other corners of the triangle within the mesh. Upon predicting the unknown texture coordinates, residual vectors that determine distances between predicted coordinates and actual coordinates are determined and entropy encoding is performed on the residual vectors. The encoder generates compressed data upon completion of the entropy encoding. On the decoding side, a decoder may perform predictions on the compressed data and uses the residual vectors to determine the actual coordinates of the triangles from the predicted coordinates of the triangles.

However, during mesh compression, known texture coordinates of corners of a triangle are not taken into consideration to predict unknown texture coordinates of other corners. This can result in non-optimal (e.g., longer) residual vectors and can lead to a technical problem such as inefficient compression of the mesh. A proposed solution to this technical problem is to use (or rely on) known texture coordinates of corners of a triangle in a mesh and/or known position coordinates to predict unknown texture coordinates of other corners. The technical advantages may include smaller size of the compressed mesh and less use of computing resources, memory, and transmission bandwidth.

For example, texture coordinates of a corner (e.g., of a triangle of the mesh) are predicted based on a texture atlas and local information associated with the corner. The texture atlas may be a portion of the texture atlas that is relevant to the corner. The local information may include texture coordinates of other corners or texture coordinates of the corner that is predicted based on geometric prediction. The prediction process is performed for several corners (of the triangles) of the mesh.

After the predicting of the texture coordinates, residual vectors for the corner may be determined for each of the predicted texture coordinates. A residual vector represents a difference between the predicted texture coordinates and the actual texture coordinates. The residual vector updates the texture coordinates to the actual texture coordinates. Upon determining of the residual vectors of the corners, entropy encoding is performed and compressed data is generated based on the entropy encoding. The use of texture atlas for predicting texture coordinates results in better prediction of the texture coordinates which results in lower entropy and better compression rates.

In some implementations, a convolutional neural network (CNN), which includes a trained model, is used for predicting texture coordinates of triangles within a mesh. The input to the trained model includes known textured meshes and known coordinates of triangles and textures. A CNN can be configured to analyze distortions in the geometry based on the known parameters when a texture atlas is generated and can be configured to correct for those distortions.

FIG. 1 illustrates an example three-dimensional (3D) image 120. The three-dimensional image 120 is a model of a tiger rendered by a graphics processor. The three-dimensional image 120 is illustrated to provide context when describing FIGS. 2A and 2B. The vertex (or position) coordinates of the 3D image 120 may be represented by X, Y, and Z coordinates (e.g., in XYZ space).

Figure 2B:
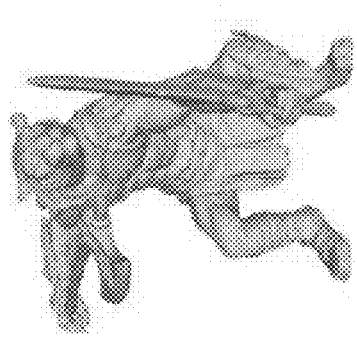
FIG. 2B illustrates an example 3D image, according to at least an example implementation.
Figure 2A:
FIG. 2A illustrates an example 2D texture atlas, according to at least an example implementation.

FIG. 2A illustrates an example 2D texture atlas 240, according to at least an example implementation. The texture is a 2D representation of the texture associated with the 3D image 120. For example, the texture atlas 240 may be a 2D image containing several smaller images (e.g., sub-images, also referred to as patches), of same or different sizes, packed together (e.g., without unnecessary gaps, too much space between the patches, etc.) to reduce the size of the texture atlas. The texture atlas 240 may also be referred to as a texture image. The images within the texture atlas 240 can be placed on a 3D surface of a mesh to add texture to a surface of the mesh.

In some implementations, the texture atlas 240 may be a 2D image generated by unwrapping geometry of the 3D image 120. The unwrapping process converts the three-dimensional texture of the 3D model 120 to a 2D plane. As shown in FIG. 2, the texture atlas 240 contains several patches, e.g., patch 242. The generation of the smaller patches during the unwrapping process minimizes distortions to the geometry (e.g., of the triangles).

A patch within the texture atlas 240 may be represented using texture coordinates in the 2D texture space. When a texture is applied to a primitive (e.g., a triangle) of the 3D image, the texture coordinates are mapped or translated to pixel locations in the 3D image. In some implementations, the texture coordinates may be represented using coordinates in the UV space, where U and V represent axes in 2D. For example, the UV coordinates of patch 242 facilitate the placement of the patch 242 on the Tiger model 260 of FIG. 2B. In some implementations, the texture atlas 240 may be generated using parametrization algorithms.

FIG. 2B illustrates an example three-dimensional (3D) image 260, e.g., a textured mesh of a 3D Tiger model. In some implementations, UV mapping may be performed to project a texture atlas onto the image 260 to add texture to the image 260. This may be achieved by mapping the texture coordinates of a patch to a corresponding location on the image 260. In other words, the patches of texture atlas are mapped to corresponding portions of the image 260 to add texture to the image 260. This mapping is possible because of a one-to-one mapping between triangles in the 2D image (240) and triangles in the 3D image (260).

Figure 3:
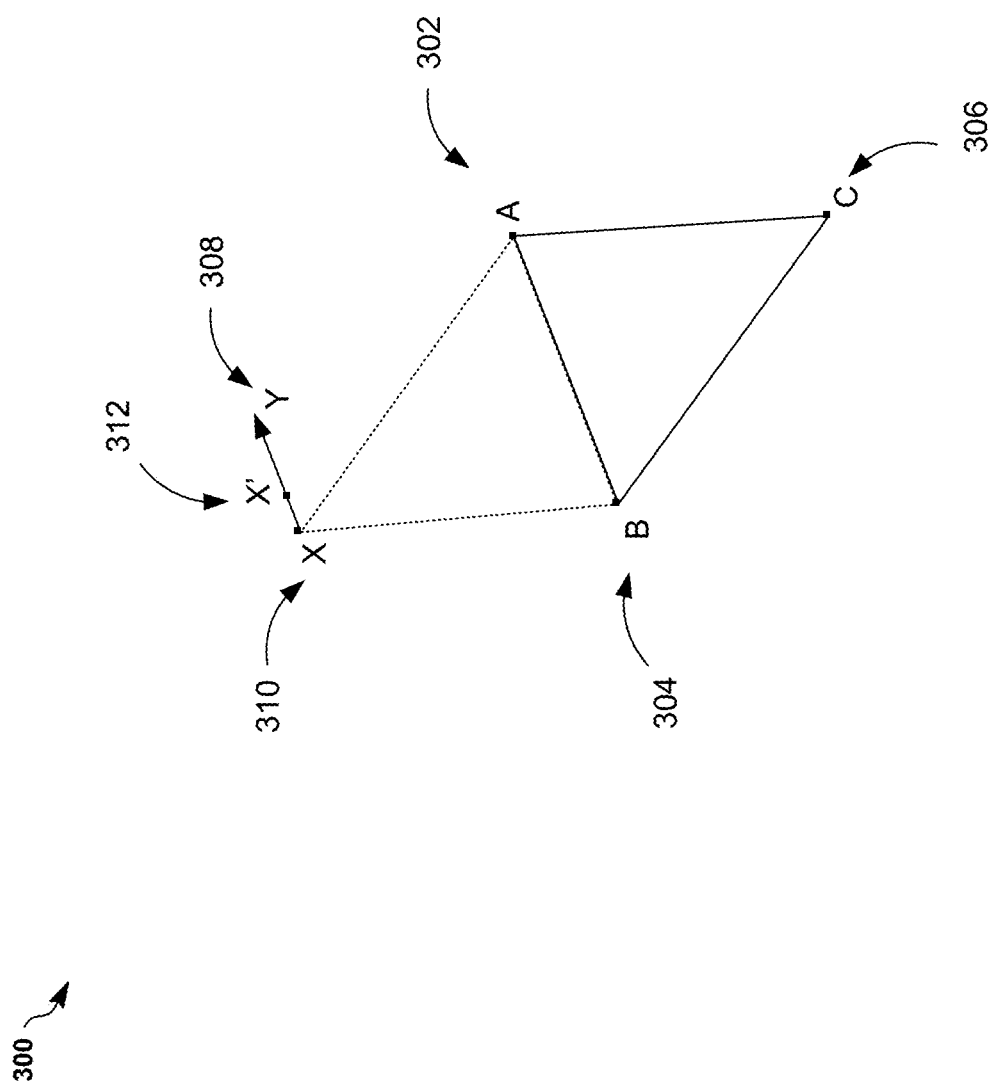
FIG. 3 illustrates an example implementation of a prediction scheme (e.g., parallelogram prediction), according to at least one example implementation.

FIG. 3 illustrates an example implementation of a prediction scheme 300 for predicting texture coordinates, according to at least one example implementation.

During mesh encoding (or compression), encoding all (or even of subset of) values (e.g., of triangles) leads to high entropy because there may be many unique values. However, the entropy may be reduced, for example, by prediction schemes that are used to predict values in a data set based on previously encoded data. For example, instead of encoding the values directly, a difference between the predicted and actual value may be encoded. The sequence of difference values have a much lower entropy as values cluster around zero (e.g., small values may repeat often) and the number of unique values may be reduced. The texture coordinates may be predicted using various prediction mechanisms, e.g., parallelogram prediction, multi-parallelogram prediction, position-based prediction, etc.

For example, in parallelogram prediction, texture coordinates (e.g., UV coordinates) of a corner Y 308 of a triangle ABY may be unknown. In some implementations, the texture coordinates of Y may be predicted based on known texture coordinates, for example, known UV coordinates of A (302) and B (304). In some implementations, the predicted texture coordinates of Y (310) may be represented by X (310), and may be determined as shown below:

$$X = A + (B - C)$$

The above formula may be read as: X is A plus the edge from C to B. The difference between the predicted texture coordinates X 310 and the actual texture coordinates Y 308 may be defined by a difference/residual vector (R), XY. The sequence of difference vectors (of the corners) may be entropy encoded. The decoder may perform the prediction mechanism (similar to the way the encoder performs the encoder performs the prediction mechanism). But, the decoder may use the residual vector for determining the actual position of the vertex Y during the decoding process.

In some implementations, a multi-parallelogram prediction may be used for predicting the texture coordinates. For example, a corner may be reached via several parallelograms and an average value of the all (or subset of) the predictions may be considered for the predicted coordinates. In some implementations, position-based prediction may be used for predicting texture coordinates. The position-based prediction may include computing the unknown UV coordinates (e.g., unknown UV coordinates of Y) using position coordinates (e.g., XYZ coordinates) of triangle ABY and UV coordinates of A and B.

In some implementations, the texture coordinates of a corner of a triangle may be predicted by taking the texture atlas into consideration. For example, as the position coordinates of A, B, C, and Y and texture coordinates of A, B, and C are known, the texture coordinates of Y 308 may be predicted as X' 312. However, the predicted texture coordinates of Y 308 may be different from the actual texture coordinates of Y 308 as there may be distortions in the texture atlas. The distortions in the texture atlas may be due to the stretching/shrinking of the texture when the geometry of the 3D image is unwrapped to generate the texture atlas (e.g., 240 of FIG. 2). Once the residual vector X'Y is determined, the residual vector may be entropy encoded with other residual vectors for generating the compressed data.

In some implementations, the residual vector X'Y is smaller than the residual vector XY as the predicting that generates the residual vector X'Y is based on texture coordinates. In other words, the prediction mechanism based on texture coordinates reduces the size of the residual vectors, thereby improving entropy encoding and achieving better compression rates.

Figure 4:
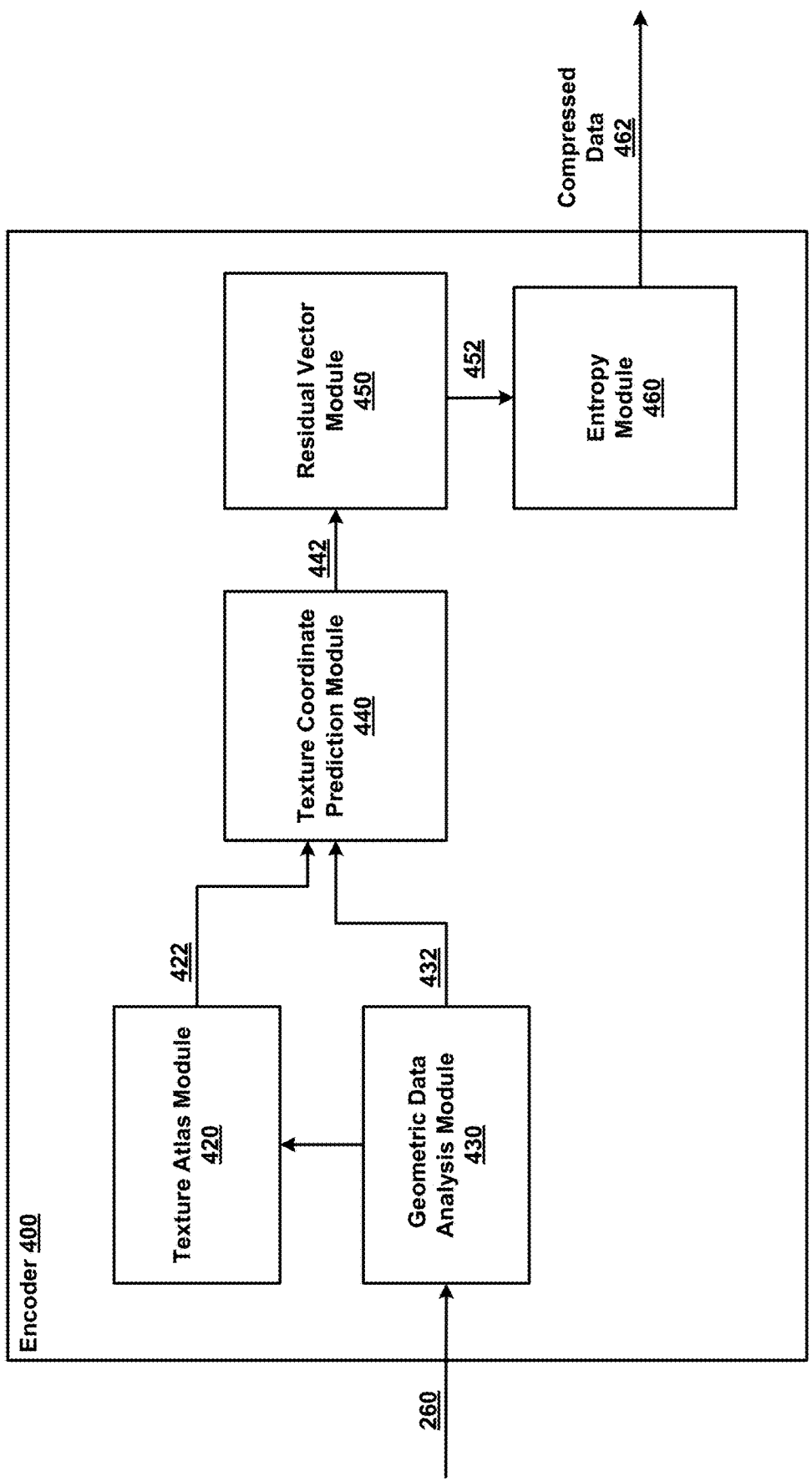
FIGS. 4-6 illustrate block diagrams of an encoder, according to example implementations.

FIG. 4 illustrates a block diagram of an encoder 400, according to at least one example implementation.

As shown in FIG. 4, the encoder 400 may include a texture atlas module 420, a geometric data analysis module 430, a texture coordinate prediction module 440, a residual vector module 450, and/or an entropy module 460. In some implementations, the three-dimensional (3D) image 260 may be input to the encoder 400. For example, the 3D image 260 may be the input to the geometric data analysis module 430. The encoder 400 may generate compressed data 462 as output.

In some implementations, the texture atlas module may generate relevant portions of the texture atlas 240 as input 422 to the texture coordinate prediction module 440. The relevant portions of the texture atlas 240 that are generated as input 422 to the texture coordinate prediction module 440 may be portions of the texture atlas 240 that are relevant (or associated) to the corners for which the texture coordinates are being predicted. The geometric data analysis module 430 may be configured to process the 3D image 260 and generate geometric data 432 that may be used, for example, for predicting texture coordinates of corners for which the texture coordinates are not known (e.g., Y 308 of FIG. 3).

In some implementations, the texture coordinate prediction module 440 may receive the relevant portions of the texture atlas 422 and/or geometric data 432 as inputs and predict the texture coordinates 442 of a corner. For example, the texture coordinate prediction module 440 may predict texture coordinates 442 of a corner of a triangle based on the corresponding texture atlas (e.g., relevant portions of the texture atlas) and local information associated with the corner. For example, in some implementations, the local information associated with the corner may include texture coordinates of the corner that are predicted based on geometric prediction, texture coordinates of other corners of the triangle that are predicted based on geometric prediction, and/or texture coordinates of other corners of other triangles in a vicinity (e.g., neighborhood, common edges, etc.) of the corner. The texture coordinate prediction module 440 may continue with predicting unknown texture coordinates of other corners of the mesh.

The residual vector module 450 may determine residual vectors 452 based on the predicted texture coordinates 442 of the corners (of the triangles of the mesh) and the entropy module 460 may perform entropy encoding of the residual vectors to generate the compressed data 462. Thus, the process described above generates compressed data 462 that is better compressed due to the way the texture coordinates are predicted using texture atlas. A decoder upon receiving the compressed data 462 may predict the texture coordinates in a way similar to the process described above and use the residual vectors to determine the actual coordinates to decode and re-generate the 3D image for display.

Figure 5:
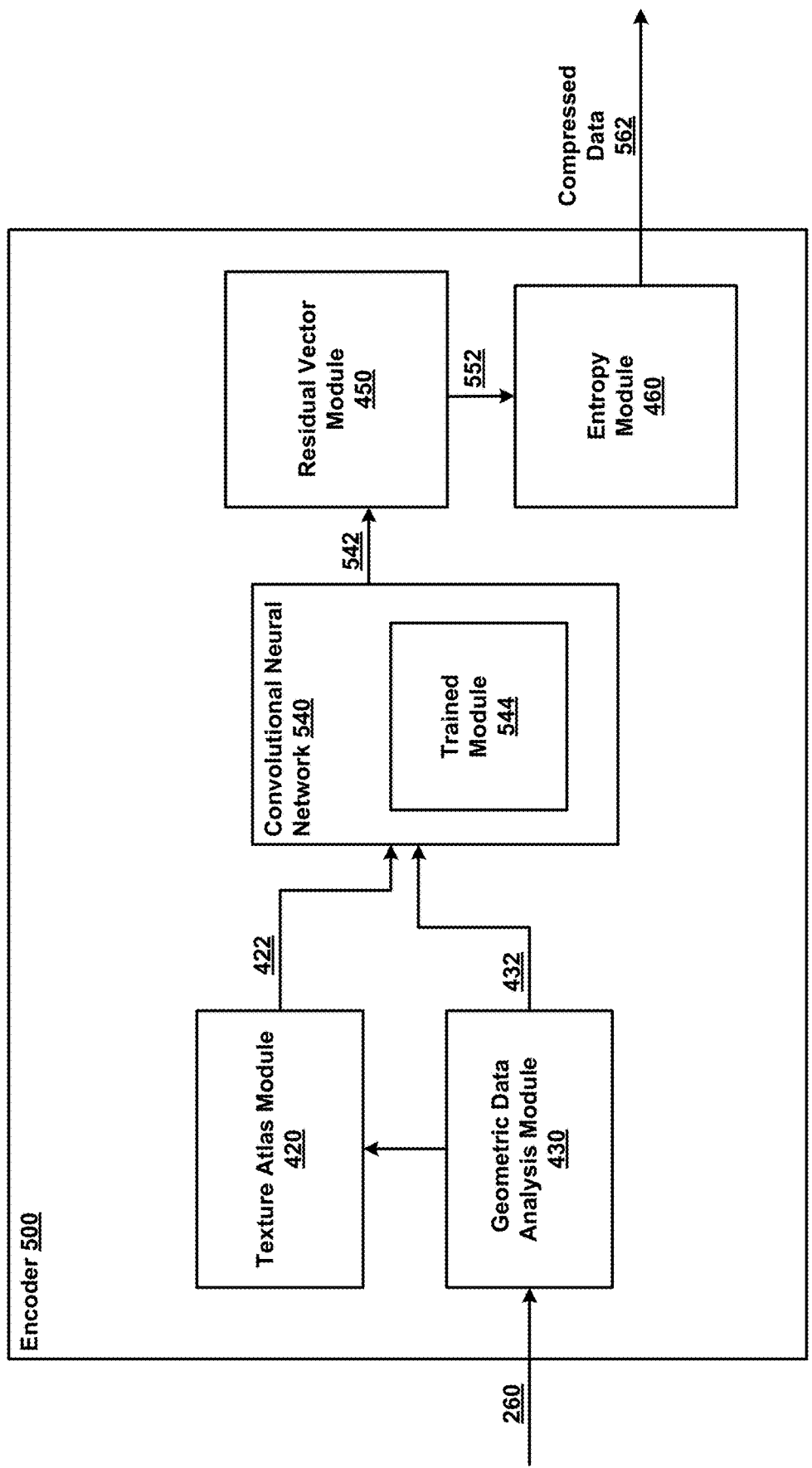

FIG. 5 illustrates a block diagram of an encoder 500, according to at least one example implementation.

In FIG. 5, in addition to the modules/components described above in reference to FIG. 4, the texture coordinates may be predicted by (or using) a convolutional neural network 540 (instead of the texture coordinate prediction module 440 of FIG. 3). In some implementations, the CNN 540 may be a class of deep-forward artificial neural network that can analyze images and predict the texture coordinates. In some implementations, the CNN 540 may include a trained module 544. The trained module 544 may be trained using known textured meshes so that it can predict texture coordinates 542 of a corner based on the corresponding texture atlas and local information associated with the corner.

The residual vector module 450 may determine residual vectors 552 based on the predicted texture coordinates 542 of the corners (of the triangles of the mesh) and the entropy module 460 may perform entropy encoding of the residual vectors to generate the compressed data 562. Thus, the process described above generates compressed data 562 that is better compressed due to the way the texture coordinates are predicted using the CNN and texture atlas.

A decoder upon receiving the compressed data 563 may perform some steps that are similar to the steps performed by the encoder. For example, the order in which corners are processed are identical for both the encoder and the decoder. In some implementations, the encoder simulates the decoder (e.g., the encoder keeps track of information that is already known to the decoder and the predictions of the decoder). Upon processing of the corners, the decoder may apply decoded residual vector to a corner. For example, a decoder upon receiving the compressed data 562 may predict the texture coordinates in a way similar to the process described above and use the residual vectors to determine the actual coordinates to decode and re-generate the 3D image for display.

Figure 6:
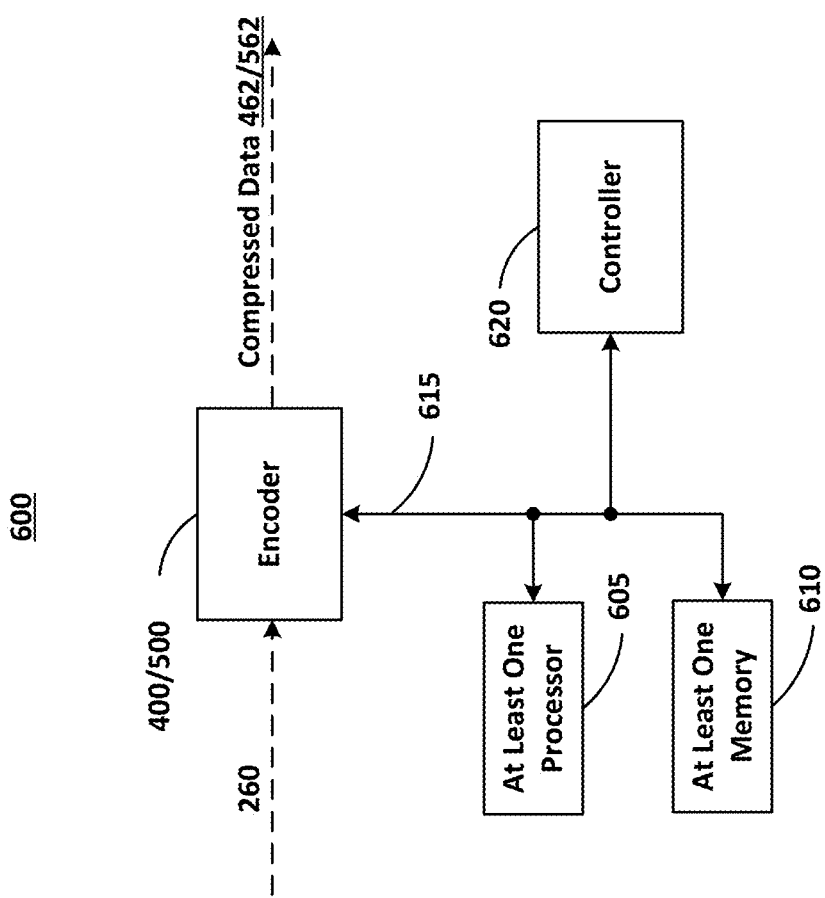

FIG. 6 illustrates the encoder system 600, according to at least one example implementation. The encoder system 600 may be understood to include various standard components which may be utilized to implement the techniques described herein, or different or future versions thereof. As shown in FIG. 6, the encoder system 600 includes the at least one processor 605, the at least one memory 610, a controller 620, and the encoder 400/500. The at least one processor 605, the at least one memory 610, the controller 620, and the encoder 400/500 are communicatively coupled via bus 615.

The at least one processor 605 may be configured to execute computer instructions associated with the controller 620 and/or the encoder 400/500. The at least one processor 605 may be a shared resource. For example, the encoder system 400/500 may be an element of a larger system.

The at least one memory 610 may be configured to store data and/or information associated with the encoder system 600. For example, the at least one memory 610 may be configured to store buffers including, for example, buffers storing geometric data, portions of the geometric data, positions of data points in the geometric data, a number of data points associated with a portion of the geometric data, and/or the like. For example, the at least one memory 610 may be configured to store models, training algorithms, parameters, data stores, and the like.

The controller 620 may be configured to generate various control signals and communicate the control signals to various blocks in encoder system 600. The controller 620 may be configured to generate the control signals in accordance with the method described below. The controller 620 may be configured to control the encoder 300 to encode geometric data using a model according to example implementations as described herein. For example, the controller

620 may generate and communicate a control signal(s) indicating a model and/or parameters associated with the model.

Figure 7:
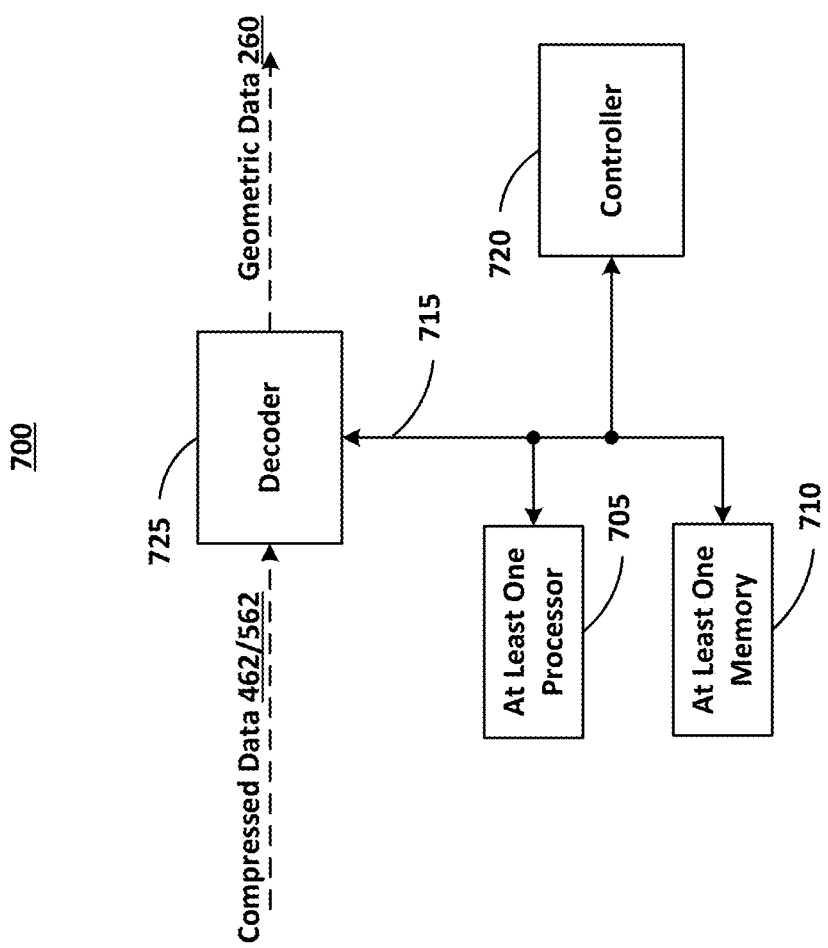
FIG. 7 illustrates a decoder system, according to at least one example implementation.

FIG. 7 illustrates a decoder system 700 according to at least one example implementation. In the example of FIG. 7, a decoder system 700 may be at least one computing device and should be understood to represent virtually any computing device configured to perform the methods described herein. As such, the decoder system 700 may be understood to include various standard components which may be utilized to implement the techniques described herein, or different or future versions thereof. By way of example, the decoder system 700 is illustrated as including at least one processor 705, as well as at least one memory 710 (e.g., a computer readable storage medium), a controller 720, and a decoder 725. The at least one processor 705, the at least one memory 710, the controller 720, and the decoder 725 are communicatively coupled via bus 715.

The at least one processor 705 may be utilized to execute instructions stored on the at least one memory 710 to implement the various features and functions described herein, or additional or alternative features and functions. The at least one processor 705 and the at least one memory 710 may be utilized for various other purposes. For example, the at least one memory 710 may represent an example of various types of memory and related hardware and software which might be used to implement any one of the modules described herein. According to example implementations, the encoder system 700 and the decoder system 700 may be included in a same larger system. Further, the at least one processor 705 and the at least one processor 705 may be a same at least one processor and the at least one memory 710 and the at least one memory 710 may be a same at least one memory. Still further, the controller 720 and the controller 720 may be a same controller.

The at least one processor 705 may be configured to execute computer instructions associated with the controller 720 and/or the decoder 725. The at least one processor 705 may be a shared resource. For example, the decoder system 700 may be an element of a larger system (e.g., a mobile device). Therefore, the at least one processor 705 may be configured to execute computer instructions associated with other elements (e.g., web browsing or wireless communication) within the larger system.

The at least one memory 710 may be configured to store data and/or information associated with the decoder system 700. For example, the at least one memory 710 may be configured to store a model and parameters associated with the geometric data, and/or the like.

The controller 720 may be configured to generate various control signals and communicate the control signals to various blocks in decoder system 700. The controller 720 may be configured to generate the control signals in accordance with the methods described below. The controller 720 may be configured to control the decoder 725 to decode compressed data associated with geometric data using a model and parameters according to example implementations as described above.

Figure 8:
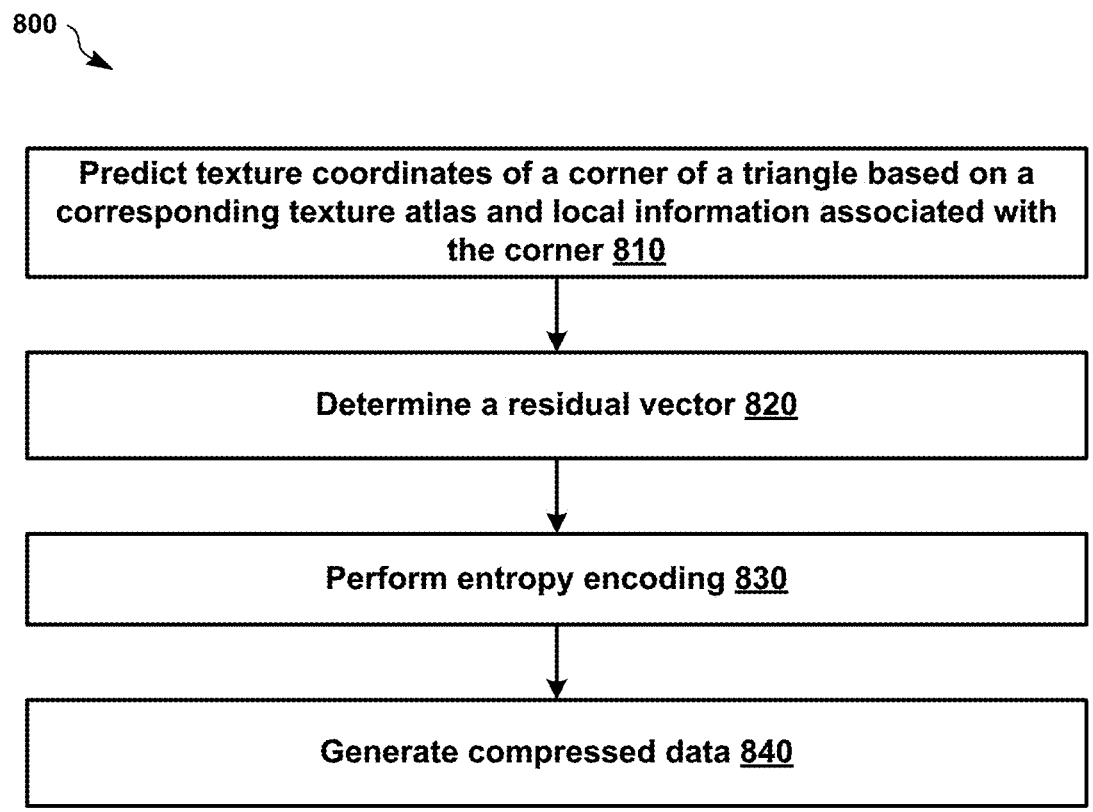
FIG. 8 illustrates a flowchart of a method of encoding, according to at least one example implementation.

The method steps described with regard to FIG. 8 may be executed as software code stored in a memory (e.g., at least one memory 610, 710) associated with an encoder and/or decoder system (e.g., as shown in FIGS. 2-6) and executed by at least one processor (e.g., processor 605, 705) associated with the encoder and/or system. For example, the memory can be a non-transitory computer-readable storage medium having storing computer executable program code which, when executed on a computer system, causes the computer system to perform steps described below with regard to FIG. 8. However, alternative implementations are contemplated such as an encoder or a decoder embodied as a special purpose processor.

For example, the method steps may be performed by an application-specific integrated circuit, or ASIC. For example, the ASIC may be configured as the encoder 400/500, the decoder 725, and/or the controller 620/720. Although the steps described below are described as being executed by a processor, the steps are not necessarily executed by a same processor. In other words, at least one processor may execute the steps described below with regard to FIG. 8.

FIG. 8 illustrates a flowchart 800 of a method of encoding (or data compression). In some implementations, for example, the method may be performed by encoder 300 of FIG. 3, encoder 400 of FIG. 4, encoder 500 of FIG. 5, or encoder 600 of FIG. 6.

At block 810, an encoder may predict texture coordinates of a corner of a triangle. In some implementations, for example, the predicting may be based on a corresponding texture atlas (e.g., corresponding portions or pixels of the texture atlas) and local information associated with the corner. The local information associated with the corner may include texture coordinates of the corner that are predicted based on geometric based prediction, texture coordinates of other corners of the triangle that are predicted based on geometric prediction, or texture coordinates of other corners of other triangles in a vicinity of the corner (e.g., neighboring corners). In other words, the encoder may predict texture coordinates (e.g., UV coordinates) of a corner based on the corresponding texture atlas (e.g., 2D image, 140 of FIG. 1B) and other information that is available at the geometric mesh (e.g., 3D mesh, 120 of FIG. 1A). Once the texture coordinates of a corner are predicted, the encoder traverses the mesh and predicts texture coordinates for other corners of the mesh.

The location information associated with a corner is used when predicting the texture coordinates. In some implementations, the local information may be determined in several ways, for example, using parallelogram prediction, valence-based prediction, or position-based prediction.

As described above in reference to FIG. 4, in some implementations, the texture coordinates may be predicted using a CNN. A convolutional network may be a class or deep, feed-forward artificial neural networks applied for analyzing/process visual imagery. The CNN may be used with the texture atlas to improve the prediction of UV coordinates.

At block 820, the encoder may determine a residual vector based on the predicted texture coordinates. In some implementations, for example, the residual vector may determined by determining/computing a difference vector representing a difference between the predicted texture coordinates and actual texture coordinates of the corner. For example, as shown in FIG. 2, the residual vector, e.g., X'Y may be determined based on the predicted texture coordinates (X') and actual texture coordinates (Y). Once the residual vector for the corner is determined, the residual vectors are determined for other corners of the mesh for which the texture coordinates have been predicted.

At block 830, the encoder may perform entropy encoding of the residual vector along with residual vectors of other corners of the geometric mesh. At block 840, the encoder may generate compressed data based on the entropy encoding.

Thus, the better prediction of the texture coordinates may lead to lower entropy which may further lead to better compression rates. This may improve end user experience as the downloading/decoding of images is faster.

Figure 9:
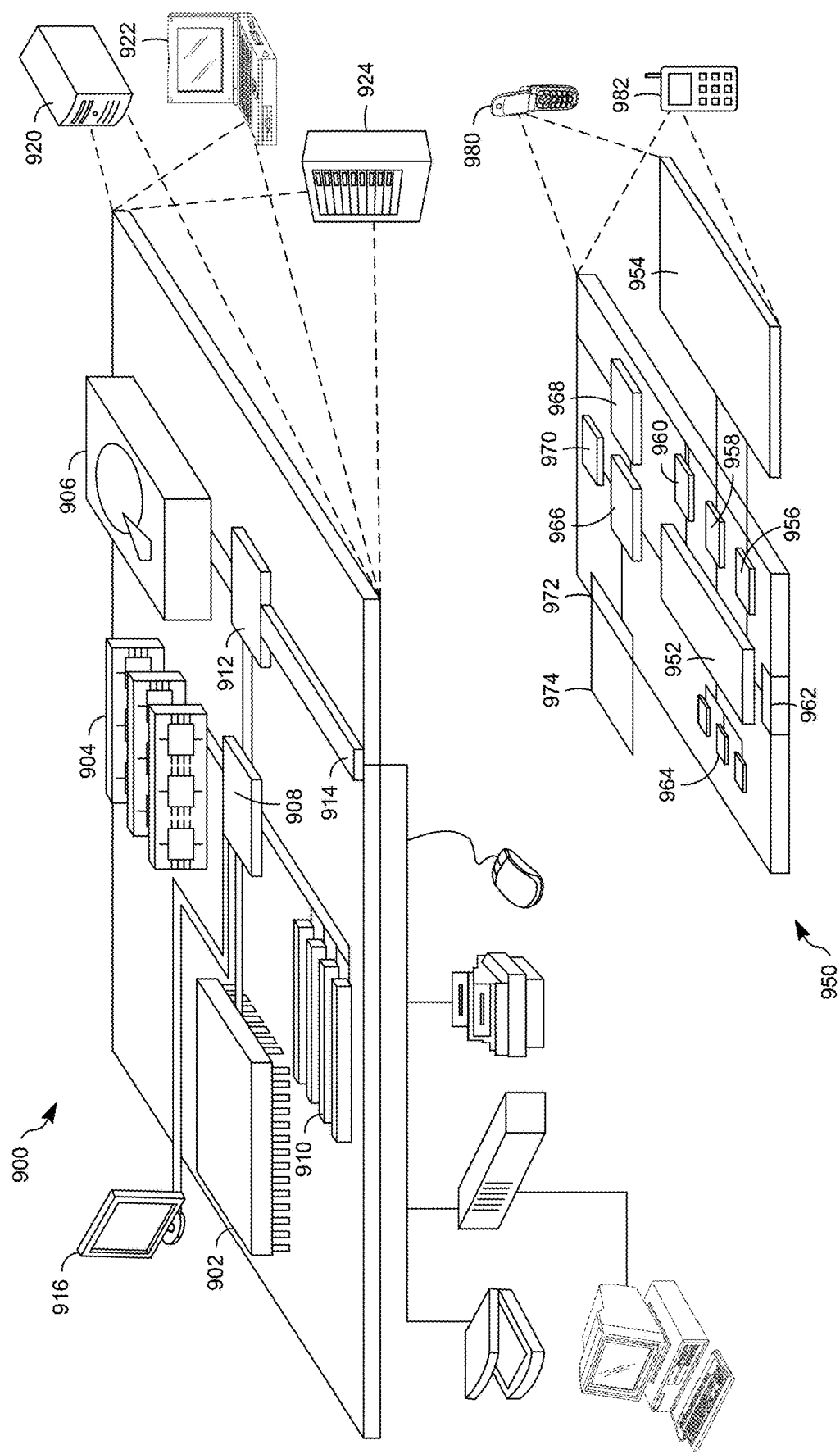
FIG. 9 illustrates an example of a computer device and a mobile computer device, which may be used with the techniques described here.

FIG. 9 shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations s only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

What is claimed is:

1. A computer-implemented method, comprising:
    predicting, by a texture coordinate prediction module, texture coordinates of a corner of a triangle, the triangle being one of a plurality of triangles of a geometric mesh, the predicting based on a corresponding texture atlas and local information associated with the corner, and the local information including texture coordinates of the corner based on geometric prediction;
    determining, by a residual vector module, a residual vector based on the predicted texture coordinates;
    performing, by an entropy module, entropy encoding of the residual vector along with residual vectors of other corners of the geometric mesh; and
    generating, by the entropy module, compressed data based on the entropy encoding.

2. The computer-implemented method of claim 1, wherein the local information associated with the corner further includes one or more of:
    texture coordinates of other corners of the triangle that are predicted based on geometric prediction; and
    texture coordinates of other corners of other triangles in a vicinity of the corner.

3. The computer-implemented method of claim 2, wherein the geometric prediction is a parallelogram prediction, a multi-parallelogram prediction, or a position-based prediction.

4. The computer-implemented method of claim 1, wherein the predicted texture coordinates of the corner include two-dimensional texture coordinates associated with a corresponding pixel of a two-dimensional texture atlas of the geometric mesh, the geometric mesh being a three-dimensional mesh.

5. The computer-implemented method of claim 4, wherein the two-dimensional texture coordinates are UV coordinates.

6. The computer-implemented method of claim 1, wherein the residual vector is a difference vector representing a difference between the predicted texture coordinates and actual texture coordinates of the corner.

7. The computer-implemented method of claim 1, wherein the texture atlas is generated by unwrapping the geometric mesh, the geometric mesh being a three-dimensional image and the texture atlas being a two-dimensional image.

8. The computer-implemented method of claim 1, wherein predicting the texture coordinates of the corner further includes:
    predicting the texture coordinates of the corner using a convolutional neural network (CNN).

9. The computer-implemented method of claim 8, wherein the CNN is trained using known texture models.

10. A non-transitory computer-readable storage medium having stored thereon computer executable program code which, when executed on a computer system, causes the computer system to perform mesh compression, comprising:
  predicting texture coordinates of a corner of a triangle, the triangle being one of a plurality of triangles of a geometric mesh, the predicting based on a corresponding texture atlas and local information associated with the corner, and the local information including texture coordinates of the corner based on geometric prediction;
  determining a residual vector based on the predicted texture coordinates;
  performing entropy encoding of the residual vector along with residual vectors of other corners of the geometric mesh; and
  generating compressed data based on the entropy encoding.

11. The computer-readable storage medium of claim 10, wherein the local information associated with the corner further includes one or more of:
  texture coordinates of other corners of the triangle that are predicted based on geometric prediction; and
  texture coordinates of other corners of other triangles in a vicinity of the corner.

12. The computer-readable storage medium of claim 11, wherein the geometric prediction is a parallelogram prediction, a multi-parallelogram prediction, or a position-based prediction.

13. The computer-readable storage medium of claim 10, wherein the predicted texture coordinates of the corner include two-dimensional UV coordinates associated with a corresponding pixel of a two-dimensional texture atlas of the geometric mesh, the geometric mesh being a three-dimensional mesh.

14. The computer-readable storage medium of claim 13, wherein the two-dimensional texture coordinates are UV coordinates.

15. The computer-readable storage medium of claim 10, wherein the residual vector is a difference vector representing a difference between the predicted texture coordinates and actual texture coordinates of the corner.

16. The computer-readable storage medium of claim 10, wherein the texture atlas is generated by unwrapping the geometric mesh, the geometric mesh being a three-dimensional image and the texture atlas being a two-dimensional image.

17. The computer-readable storage medium of claim 10, wherein predicting the texture coordinates of the corner further comprises code for:
  predicting the texture coordinates of the corner using a convolutional neural network (CNN).

18. The computer-readable storage medium of claim 17, wherein the CNN is trained using known texture models.

19. An encoder, comprising:
  a texture coordinate prediction module configured to predict texture coordinates of a corner of a triangle, the triangle being one of a plurality of triangles of a geometric mesh, the predicting based on a corresponding texture atlas and local information associated with the corner, and the local information includes texture coordinates of the corner based on geometric prediction;
  a residual vector module to determine a residual vector based on the predicted texture coordinates; and
  an entropy module to perform entropy encoding of the residual vector along with residual vectors of other corners of the geometric mesh and generate compressed data based on the entropy encoding.

20. The encoder of claim 19, wherein the texture coordinate prediction module is further configured to predict the texture coordinates based on the local information associated with the corners which further includes one or more of:
  texture coordinates of other corners of the triangle that are predicted based on geometric prediction; and
  texture coordinates of other corners of other triangles in a vicinity of the corner.

* * * * *